May 15, 1951  W. E. WITHALL  2,552,701
FRICTION SHOCK ABSORBER FOR RAILWAY CAR TRUCKS
Filed July 12, 1949
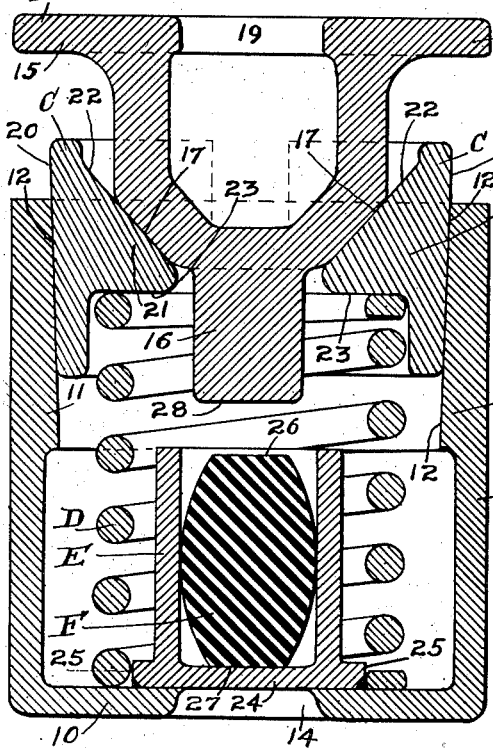
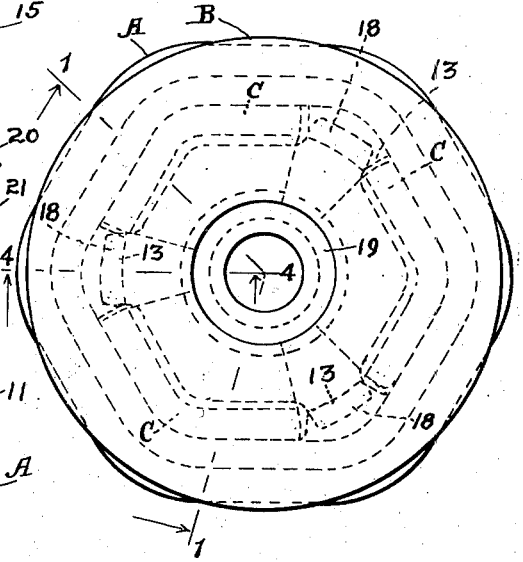
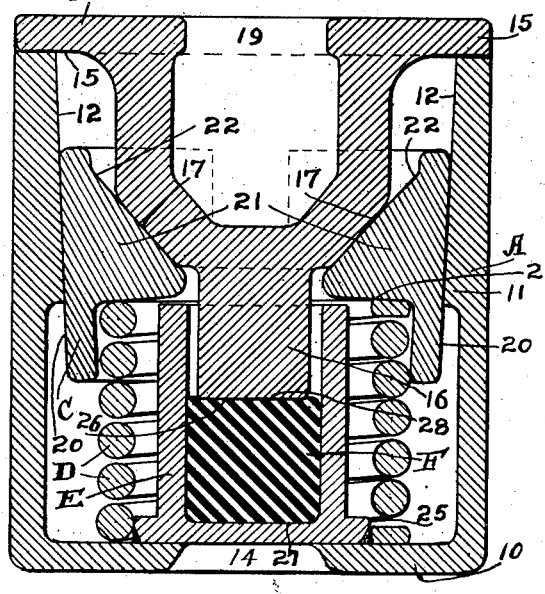
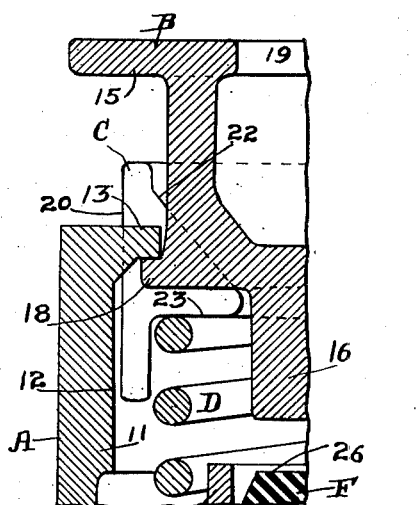
Inventor:
William E. Withall.
By Henry Fuchs.
Atty.

Patented May 15, 1951

2,552,701

UNITED STATES PATENT OFFICE 2,552,701

FRICTION SHOCK ABSORBER FOR RAILWAY CAR TRUCKS

William E. Withall, Hinsdale, Ill., assignor to W. H. Miner, Inc., Chicago, Ill., a corporation of Delaware Application July 12, 1949, Serial No. 104,331

3 Claims. (Cl. 267—9)

This invention relates to improvements in friction shock absorbers, especially adapted for use in connection with railway car truck springs for snubbing or dampening the action of the same.

One object of the invention is to provide a friction shock absorber for dampening or snubbing the action of truck springs of railway cars, including a friction casing, a friction clutch comprising a wedge and friction shoes slidingly telescoped within the casing, cushioning means within the casing, yieldingly opposing inward movement of the shoes, wherein movement of the wedge inwardly of the casing, near the end of the compression stroke of the mechanism, is directly opposed by an additional cushioning element, thus absorbing the excessively heavy shocks and providing additional pressure in release to force the wedge away from the shoes and thus facilitate release of the mechanism.

Other objects of the invention will more clearly appear from the description and claims hereinafter following.

In the accompanying drawing forming a part of this specification, Figure 1 is a vertical sectional view of my improved shock absorber, said section being on two intersecting planes 120 degrees apart, corresponding substantially to the line 1—1 of Figure 2. Figure 2 is a top plan view of Figure 1. Figure 3 is a view, similar to Figure 1, showing the mechanism compressed. Figure 4 is a vertical sectional view, partly broken away, corresponding substantially to the line 4—4 of Figure 2.

As shown in the drawing, my improved shock absorber comprises broadly a friction casing A, a wedge B, three friction shoes C—C—C, a spring resistance D, a dashpot E, and a rubber cushioning element F.

The friction casing A is in the form of a tubular member of substantially hexagonal, transverse cross section. The casing A is open at the upper end and has a transverse bottom wall 10 at its lower end. At the open end thereof, the walls of the casing are inwardly thickened to provide a friction shell section 11. The friction shell section 11 presents three longitudinally extending, inwardly converging friction surfaces 12—12—12 of V-shaped, transverse cross section. At the open upper end, the casing is provided with three interior stop lugs 13—13—13, which are alternated with the three friction surfaces 12—12—12. The bottom wall 10 of the casing is provided with a central opening 14 therethrough, adapted to accommodate the usual spring centering projection of the bottom spring plate of a cluster of truck springs of a railway car.

The wedge B is in the form of a hollow block having a laterally outwardly projecting, annular flange 15 at its outer or upper end. At its inner or lower end, the wedge block B is provided with a postlike projection forming a plunger 16 integral with said block. Above the plunger 16, the wedge block B has three wedge faces 17—17—17 of V-shaped, transverse cross section, arranged symmetrically about the longitudinal central axis of said wedge. The three faces 17—17—17 converge inwardly or downwardly of the mechanism. At the lower or inner ends of the wedge faces 17—17—17, the wedge block B has three laterally outwardly projecting radial lugs 18—18—18, which are alternated with the wedge faces, as clearly shown in Figures 2 and 4. In other words, the lugs 18—18—18 are arranged so that they are located between adjacent wedge faces and extend between adjacent shoes C—C to engage in back of the lugs 13—13—13 of the casing and restrict outward movement of the wedge block. At the top end, the wedge B presents an opening 19 adapted to accommodate the usual spring centering projection of the top spring plate of a truck spring cluster.

The three friction shoes C—C—C are of similar design, each shoe having an outer, longitudinally extending, V-shaped friction surface 20, engaged with one of the V-shaped surfaces 12 of the casing A. On its inner side, each shoe is provided with an enlargement 21, presenting a V-shaped wedge face 22, engaged with one of the wedge faces 17 of the wedge B. At the inner end of the enlargement 21, each shoe presents a flat, transverse abutment face 23.

The spring resistance D is in the form of a helical coil, disposed within the casing A, having its upper end bearing on the flat abutment faces 23 of the shoes and its bottom end resting on the bottom wall 10 of the casing.

The dashpot E is in the form of a hollow, cylindrical, tubular member, open at the top and closed at its bottom end by a transverse wall 24, which protrudes laterally outwardly of the main body portion proper of the dashpot E, thus providing a peripheral flange 25. The dashpot E is disposed within the spring D, being supported on the bottom wall 10 of the casing A and preferably welded thereto. As shown, the flange 25 snugly fits within the spring D.

The cushioning element F is in the form of an elongated rubber block of circular cross section, tapered toward its top and bottom ends. The top and bottom ends of the element F are substantially flat, as indicated at 26 and 27. The element F is disposed within the dashpot E with its bottom end supported on the wall 24 of the dashpot and its flat top end 26 opposed to the flat bottom end face 28 of the plunger 16.

As illustrated in Figure 1, which shows the normal fully expanded condition of the shock absorber, the upper end of the rubber block F is disposed slightly below the level of the open upper end of the dashpot E and a considerable distance below the bottom end of the plunger 16 of the wedge B.

My improved shock absorber preferably replaces one or more of the spring units of a truck spring cluster of a railway car, being interposed between the top and bottom spring plates of said spring cluster.

The operation of my improved shock absorber is as follows: Upon the spring cluster of the truck of a railway car being compressed between the spring follower plates of the cluster, the wedge B is forced downwardly with respect to the casing A, spreading the shoes C—C—C apart and carrying the same inwardly of the casing against the resistance of the spring D. High frictional resistance is thus provided during the compression of the mechanism. As compression of the mechanism progresses, the plunger 16 of the wedge B comes into engagement with and compresses the rubber block element F, which is confined within the dashpot E, greatly increasing the resistance provided during the final portion of the compression stroke. Downward movement of the wedge B will be finally arrested by engagement of the flange 15 thereof with the open top end of the casing A.

During recoil of the truck springs, the pressure on the wedge B is reduced and the expansive action of the rubber block F and of the coil spring D restores all of the parts of the mechanism to the full release position shown in Figure 1, release being initiated by the rubber block element F, which acts directly against the wedge B to force it away from the shoes C—C—C and permit the clutch of the mechanism to collapse.

I claim:

1. In a friction shock absorber, the combination with a friction casing having one end open and the other end closed by a transverse wall; of a dashpot within the casing extending upwardly from said transverse wall; a plurality of friction shoes slidingly telescoped within the casing; a spring buttressed at one end against said shoes and at its other end against said transverse wall, said spring surrounding said dashpot; yielding movement resisting means within said dashpot; and a wedge in wedging engagement with the shoes, said wedge having an inwardly projecting plunger thereon normally spaced from said dashpot, said plunger being movable with said wedge toward said dashpot to compress said yielding movement resisting means.

2. In a friction shock absorber, the combination with a friction casing having one end open and the other end closed by a transverse wall; of a dashpot within the casing extending upwardly from said transverse wall; a plurality of friction shoes slidingly telescoped within the casing; a spring buttressed at one end against said shoes and at its other end against said transverse wall, said spring surrounding said dashpot; a rubber block within said dashpot; and a wedge in wedging engagement with the shoes, said wedge having an inwardly projecting plunger thereon normally spaced from said dashpot, said plunger being movable with said wedge toward said dashpot to compress said rubber block.

3. In a friction shock absorber, the combination with a friction casing open at its upper end and having its bottom end closed; of a plurality of friction shoes slidingly telescoped within the casing; a wedge block above said casing, having wedging engagement with the shoes; a depending plunger section on said wedge block; an upstanding dashpot within the casing at the bottom end thereof, said dashpot being in longitudinal alignment with said plunger section of the wedge block; a rubber block supported within said dashpot and, in the normal full release position of the parts of the mechanism, having its upper end spaced from the lower end of said plunger section a distance less than the full compression stroke of the mechanism; and a spring surrounding said dashpot and bearing at its top and bottom ends on the shoes and the bottom end of the casing, respectively.

WILLIAM E. WITHALL.

REFERENCES CITED

The following references are of record in the file of this patent:

UNITED STATES PATENTS

| Number | Name | Date |
| --- | --- | --- |
| 110,204 | Cochran | Dec. 20, 1870 |
| 150,077 | Pickels | Apr. 21, 1874 |
| 1,853,857 | Glascodine et al. | Apr. 12, 1932 |
| 1,922,703 | Lounsbury | Aug. 15, 1933 |
| 1,936,389 | Hallquist | Nov. 21, 1933 |
| 2,373,813 | Dath | Apr. 17, 1945 |
| 2,421,075 | Lehman | May 27, 1947 |
| 2,463,373 | Gadbois | Mar. 1, 1949 |